July 9, 1935.  D. H. ANNIN  2,007,671
CONTROL INSTRUMENT
Filed Aug. 26, 1933
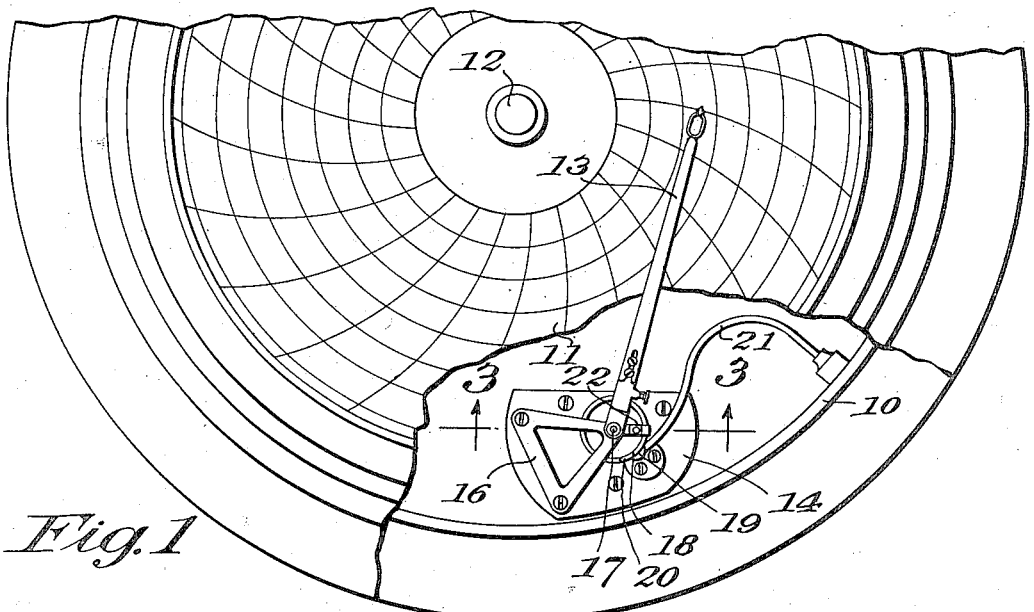
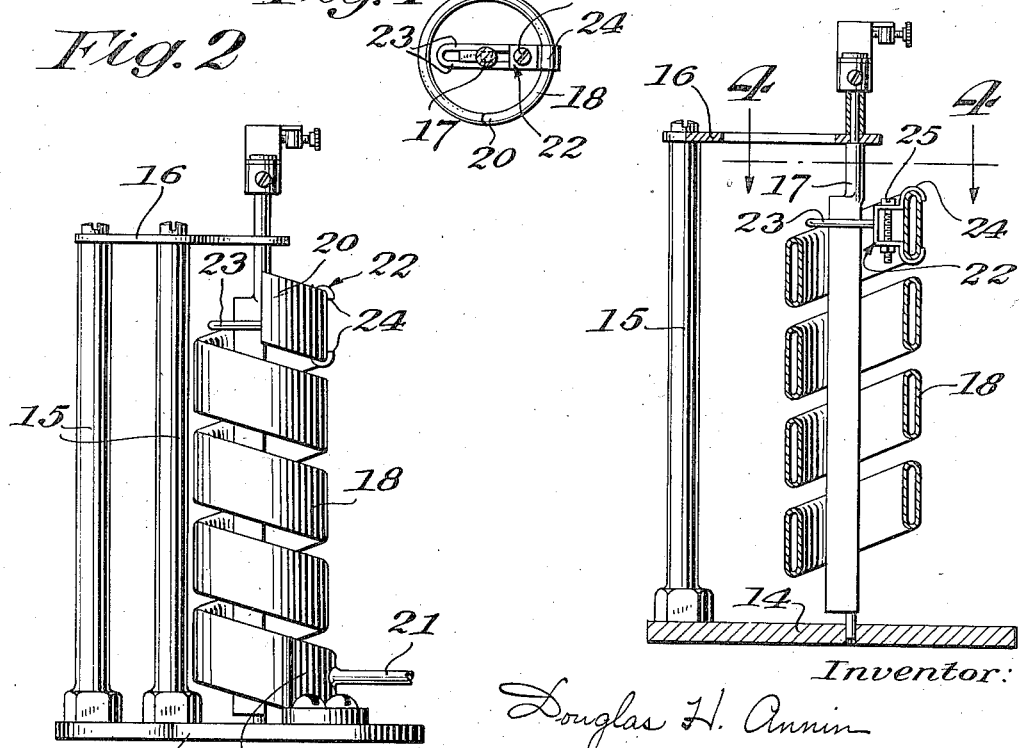
Inventor:
Douglas H. Annin
By Macleod, Calvert, Copeland & Dike
Attorneys Patented July 9, 1935

2,007,671

UNITED STATES PATENT OFFICE 2,007,671

CONTROL INSTRUMENT

Douglas H. Annin, Brookline, Mass., assignor, by mesne assignments, to Eldon Macleod, Westwood, Mass., Frank A. Morrison, Newton, Mass., Cameron Macleod, Berwyn, Pa., Leslie Soule, Dedham, Mass., Sullivan A. Sargent, Jr., Needham, Mass., trustees doing business as Mason-Neilan Regulator Company, Boston, Mass.

Application August 26, 1933, Serial No. 686,948

4 Claims. (Cl. 297—10)

This invention relates to control instruments and more particularly to an improved means for transmitting the movement of an element responsive to the variable physical condition of a medium to an operating or recording means.

An object of the invention is to provide an instrument wherein the control or record shall be directly responsive to the variable physical condition, and in which the movement of the element responsive to the variable condition shall be directly transmitted to the operating or recording means, accurately and uniformly, and without distortion or change of proportion.

Previous constructions of which I am aware have not transmitted the movement accurately and uniformly enough, and as a consequence have not been satisfactory in installations where accurate control or recording is essential throughout the entire range of movement of the responsive instrument.

In the drawing:

Fig. 1 is a front elevation of an instrument embodying my invention, with parts broken away to disclose the interior;

Fig. 2 is an elevation of the operating mechanism;

Fig. 3 is a vertical sectional view of the mechanism shown on lines 3—3 of Fig. 1.

Fig. 4 is a plan view of part of the operating mechanism with the top removed, on lines 4—4 of Fig. 3.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, 10 represents a casing of usual construction upon which there is mounted a suitable graduated chart 11 carried on spindle 12, and rotated by suitable means such as clock mechanism not shown. An index arm or pen arm 13 is suitably supported at one end and arranged to travel across chart 11 in an arcuate radial direction, to record on the chart the changes in the variable condition being recorded.

As is usual in a control instrument of this type, there is mounted in the casing 10 a suitable base or support 14 carrying two upright rods 15 spaced apart, upon which is mounted a triangular shaped arm 16 with an apex at each rod and the third apex providing a bearing for an operating shaft 17, to be later described. Upon the support 14 is fixed an instrument responsive to changes in a variable condition, such as pressure, which comprises a helically coiled Bourdon tube 18 having an end 19 fixed in said base 14 and a sealed movable end 20. The tube 18 is preferably of the usual flattened shape in cross-section and is connected at its fixed end 19 by a small tube 21 to a source of pressure, a suitable container (not shown) of the material whose pressure is being recorded or under control. It will be understood that the tube 18 tends to wind or unwind according to fluctuations in the pressure connected to the tube. The operating shaft 17 is suitably journalled between the bearings in the arm 16 and base 14 and is located in a substantially central position within the coil of the tube 18 and preferably co-axial therewith. Operating shaft 17 is preferably enlarged between its ends into a flattened strip, and is connected by means of a member 22 to the movable end 20 of Bourdon tube 18. Member 22 is preferably composed of two parallel arms 23 engaging the flat sides of operating shaft 17 and slidable thereon and may be closed at both ends if desired. Member 22 is then connected by suitable clamping means 24 to the movable end 20 of tube 18. A nut and bolt 25 is used herein for this purpose. The arms 23, while closed at their ends are made long enough to extent beyond the sides of operating shaft 17, thereby providing ample lost motion area between shaft 17 and movable end 20 of tube 18. It will be noted that member 22 engages shaft 17 for the purpose of directly transmitting any circumferential movement of movable end 20 of Bourdon tube 18 to said operating shaft, but is slidable on said shaft for preventing the transmission of axial and radial movement of the movable end 20 of Bourdon tube 18 because of the lost motion means provided in said member. The index or pen arm 13 is rigidly connected to the upper end of operating shaft 17 to move therewith and to record changes in pressure transmitted through Bourdon tube 18. It is understood that pen arm 13 may control valve means or other mechanism, where recording is not sought.

It is obvious from my construction that any circumferential or rotary movement of the free end 20 of Bourdon tube 18 is directly transmitted to the operating shaft, and is not deflected or distorted by any lengthening or axial, and spreading or radial movement of said tube. Axial or radial forces of the free end 20 of tube 18 are unable to affect the operating shaft 17 and are eliminated by the lost motion means provided for the sliding member 22. Thus the circumferential or rotary movement to free end 20 of tube 18 is transmitted to operating shaft 17 uninfluenced by axial and radial forces. In this way the movement of the instrument responsive to changes in pressure is directly transmitted to the recording means and an accurate record of these changes may be secured. In my construction it is unnecessary to worry about precise co-axial alinement of the tube and operating shaft. The construction is easily put together and taken apart and the clamp, instead of solder, allows calibration of the instrument in the field.

I claim:

1. A control instrument of the class described, having in combination, a coiled element having one end fixed and the other movable, a non-circular rotatable shaft disposed co-axially within the coil of said element, and a member engaging said shaft and attached at one end to the movable portion of said element for transmitting circumferential movement of said element to said shaft, and providing lost motion for axial and radial movement of said element.

2. A control instrument of the class described, having in combination, a helically coiled responsive element having one end fixed and the other movable, a non-circular rotatable shaft disposed within the coil of said element, and a member engaging said shaft, and attached at one end to the movable portion of said element for transmitting the circumferential movement of said element to said shaft, and slidable on said shaft for providing lost motion for axial and radial movement of said element.

3. A control instrument of the class described, having in combination, a helically coiled element having one end fixed and the other movable, a flat rotatable shaft co-axially disposed within the coil of said element, and a member having two parallel arms engaging the flat sides of said shaft for transmitting circumferential movement, and slidable on said shaft to provide lost motion for axial and radial movement of said element.

4. A control instrument of the class described, having in combination, a helically coiled element having one end fixed and the other movable, a non-circular rotatable shaft disposed within the coil of said element, and a member engaging said shaft and attached at one end to the movable portion of said element for transmitting the circumferential movement of said element to said shaft, and slidable on said shaft to provide lost motion for axial and radial movement of said element, a base providing a support for the fixed end of said element and providing bearings for the opposite ends of said shaft, and an index carried by said shaft.

DOUGLAS H. ANNIN.